T. E. IRION.
AUTOMOBILE LOCK.
APPLICATION FILED MAY 11, 1920.
1,359,068.
Patented Nov. 16, 1920.
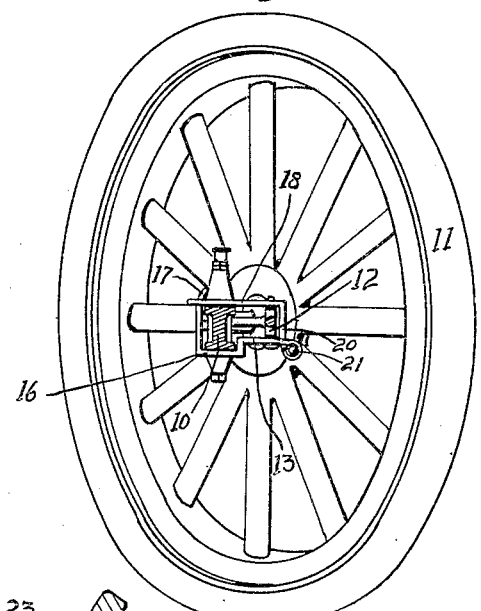
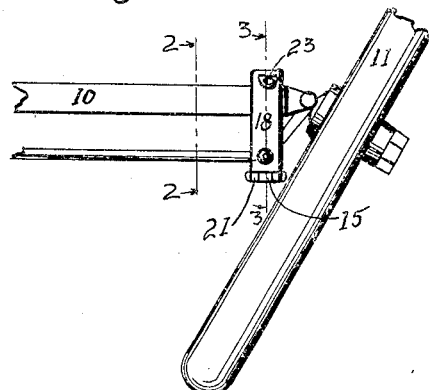
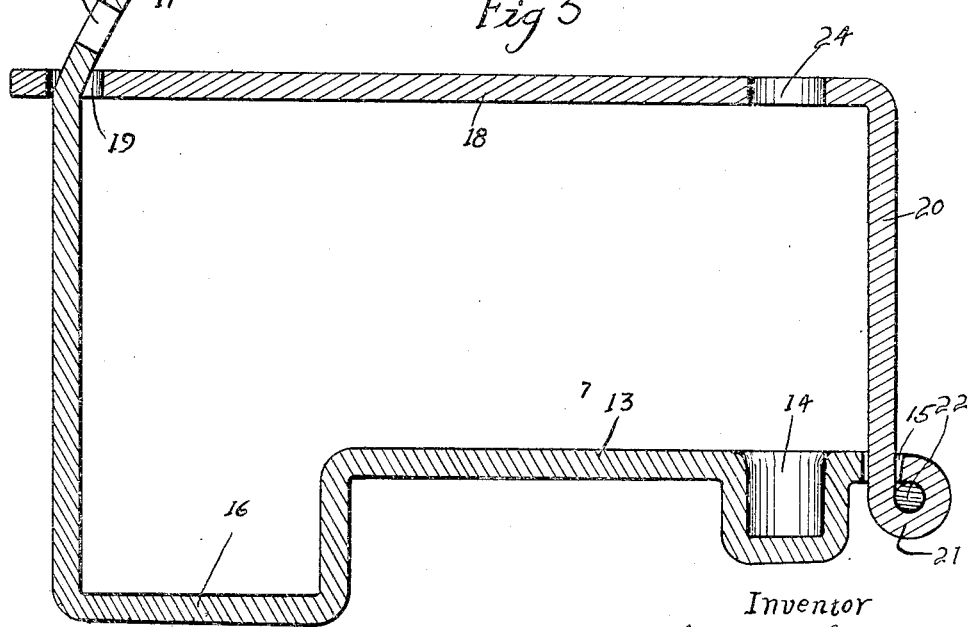
Witness
K. Patterson
Inventor
Thomas E. Irion
By Orwig & Bair, Attorneys

UNITED STATES PATENT OFFICE.

THOMAS E. IRION, OF DES MOINES, IOWA.

AUTOMOBILE-LOCK.

1,359,068. Specification of Letters Patent. Patented Nov. 16, 1920.

Application filed May 11, 1920. Serial No. 380,665.

*To all whom it may concern:*

Be it known that I, THOMAS E. IRION, a citizen of the United States, and a resident of Des Moines, in the county of Polk and State of Iowa, have invented a certain new and useful Automobile-Lock, of which the following is a specification.

The object of my invention is to provide an automobile lock of simple, durable and inexpensive construction.

More particularly it is my object to provide a simply constructed lock of the kind mentioned which can be used for locking the front wheels of an automobile in a certain position which would make it impossible to move the car away any substantial distance until the lock is released.

With these and other objects in view my invention consists in the construction, arrangement and combination of the various parts of the device, whereby the objects contemplated are attained, as hereinafter more fully set forth, pointed out in my claim and illustrated in the accompanying drawings, in which:

Figure 1 shows a top or plan view of a portion of the front axle of an automobile, one of the front wheels having installed thereon a lock embodying my invention.

Fig. 2 shows a sectional view taken on the line 2—2 of Fig. 1; and

Fig. 3 shows a sectional view through the lock device taken on the line 3—3 of Fig. 1.

In the accompanying drawings I have used the reference numeral 10 to indicate generally the front axle of an automobile on which is mounted in the ordinary way the road wheel 11. I have indicated at 12 the steering knuckle.

My improved lock comprises a horizontal bar 13 having near one end a cup-shaped depression 14 in its upper surface designed to receive the lower end of the steering knuckle bolt and the nut thereon.

Formed on the end of the bar 13 near the depression 14 is a bearing member 15. At the other end of the bar 13 is a downwardly projecting upwardly opening U-shaped portion 16, the forward arm of which extends upwardly a considerable distance above the bar 13 and terminates in a curved extension 17, curved on the arc of a circle having its center at the center of the bearing 15.

My lock device includes another bar 18 having near one end a hole 19 to receive the extension 17, and having at the other end a portion 20 extended at right-angles from the bar 18 toward the bar 13.

The end of the extension or portion 20, farthest from the bar 13 has a pair of spaced bearing members 21. A pintle 22 extends through the bearings 21 and 15 for hinging together the members 20 and 13.

In the curved extension 17 is a hole 23 to receive the shackle of a padlock.

In the bar 18 near the portion 20 is a hole 24 arranged to register with the cup-shaped depression 14 when the device is in locked position.

In the practical use of my improved automobile lock, the front wheels 11 of the automobile are turned and cramped, as illustrated for instance in Fig. 1, one of the wheels being turned rearwardly and inwardly, as shown in the drawing.

The lock is placed with the lower part of the axle 10 received in the U-shaped member 16, as shown for instance in Fig. 2, and with the lower end of the steering knuckle bolt received in the socket or depression 14.

It will, of course, be understood that the lock is in its open position when placed on the axle, as mentioned.

The bar 18 is then moved to closed position above the axle and with the upper end of the steering knuckle bolt projecting into or through the opening 24, and with the extension 17 projecting through the hole 19, as illustrated in Fig. 3.

The padlock shackle is then extended through the hole 23 and the padlock is locked.

It will be noted that thereupon the automobile will be locked against any general movement until the lock is removed for the reason that the steering knuckle cannot be moved for straightening out the front wheels, and on account of the peculiar shape of the lock which cannot be adjusted on the axle or the steering knuckle until the padlock or other lock device, which may be employed, is taken off.

Attention is called to the fact that the nut on the steering knuckle is protected by the socket or cup-shaped depression 14 so that it cannot be removed for sliding the lock on the axle. It is, therefore, obvious that only by breaking the padlock or other lock can the automobile be operated in the ordinary way.

It is, of course, my intention to make the lock of such material that it would be difficult to break it in a short time. The great value of any automobile lock arises from the fact that it causes substantial delay on the part of the thief.

I call attention to the extreme simplicity of my lock and to the fact that it can be made with dies which makes it inexpensive.

By very slight variation in size and form the lock may be adapted for use with a considerable number of different kinds and makes of automobiles.

Some changes may be made in the construction and arrangement of the parts of my improved automobile lock without departing from the essential features and purposes of my invention, and it is my intention to cover by my claim any modified forms of structure or use of mechanical equivalents which may be reasonably included within their scope.

I claim as my invention:

In an automobile lock, a bar having near one end a cup-shaped socket opening upwardly, and adjacent to said socket a bearing, said bar having near its other end a downwardly extending upwardly opening U-shaped portion, one arm of which extends upwardly considerably beyond said bar, and terminates in a curved extension, a second bar having an opening near one end receiving said extension, and having an opening near the other end arranged to register with said socket when the lock is closed, and having near said other end a portion extending away from said second bar substantially at right-angles thereto, and having at its end farthest from said second bar a bearing and a pintle in said bearing.

Des Moines, Iowa, April 30, 1920.

THOMAS E. IRION.